United States Patent [19]

Cunningham et al.

[11] Patent Number: 4,869,917
[45] Date of Patent: Sep. 26, 1989

[54] POWDERED MIX FOR PRODUCING A THREE-LAYERED DESSERT AND PROCESS THEREFORE

[75] Inventors: Colin W. Cunningham, East Brunswick; Steven J. Malits, Freehold; Charles W. Bertalan, New Brunswick, all of N.J.

[73] Assignee: General Foods Corporation, White Plains, N.Y.

[21] Appl. No.: 224,978

[22] Filed: Jul. 27, 1988

[51] Int. Cl.$^4$ .................................................. A23L 1/04
[52] U.S. Cl. ..................................... 426/576; 426/564; 426/573
[58] Field of Search .......................... 426/573, 576, 564

[56] References Cited

U.S. PATENT DOCUMENTS

| | | | |
|---|---|---|---|
| 2,694,643 | 11/1954 | Robinson et al. | 426/576 |
| 2,913,342 | 11/1959 | Cameron et al. | 426/98 |
| 3,295,986 | 1/1967 | Saslaw et al. | 426/98 |
| 3,579,355 | 5/1971 | Wyss et al. | 426/576 |
| 3,734,745 | 5/1973 | Cassanelli et al. | 426/163 |
| 4,002,771 | 1/1977 | Henderson et al. | 426/103 |

FOREIGN PATENT DOCUMENTS 1072768 6/1967 United Kingdom .

OTHER PUBLICATIONS

Whistler et al., Starch Chemistry and Technology, 2nd Ed., 1984, Academic Press, Inc., pp. 615-618.

*Primary Examiner*—Donald E. Czaja
*Assistant Examiner*—Helen Pratt
*Attorney, Agent, or Firm*—Thomas R. Savoie; Daniel J. Donovan

[57] ABSTRACT

A dry-blended dessert mix which upon successive whipping with water at various temperatures produces, upon cooling, a three-layered, multitextured gelatin dessert. The mix is a blend of a non-whippable dry fat emulsion, gelatin, sweetener, acid, flavor and color.

15 Claims, No Drawings

POWDERED MIX FOR PRODUCING A THREE-LAYERED DESSERT AND PROCESS THEREFORE

BACKGROUND OF THE INVENTION

This invention relates to powdered, gelatin-containing dessert mixes for use in making multi-layered and multi-textured desserts. Such a product is known to the art, having been described in U.S. Pat. No. 3,579,355 to Wyss et al.

According to this patent, the powdered mix is prepared by plating heated fat and emulsifiers onto a fraction of a granulated sugar component and then dry-blending this fat/sugar admixture with additional sugar and gelatin. This process necessitated the use of a relatively-high level of fat and is costly in terms of capital and labor. The Wyss et al. patent describes a process involving ribbon mixing, roll refining and either grinding, such as in a Fitz ™ mill, or depositing from a chip depositor.

U.S. Pat. No. 4,002,791 to Henderson et al. describes the Wyss et al. process as one in which the sugar particles may not be coated optimally and discloses as an improvement a process wherein melted fat is sprayed onto cold sugar. The Henderson et al. process requires the use of liquid or solid carbon dioxide and still requires a relatively-high level of fat and produces a fat-sugar component which must be kept cool during processing and which could, at storage temperatures, lead to clumping in the packaged dessert mix. Additionally, as both the Wyss et al. and Henderson et al. products use sucrose, the formulation of a sugar-free product is foreclosed. A process wherein the manufacturer of powdered dessert mixes merely has to dry-blend ingredients and does not have to employ cryogenic coolants would be much preferred. However, prior attempts to produce a dry-blended, powdered, gelatin-containing dessert mix which will produce a three-layered, multi-textured dessert have not proven successful.

Dry fat emulsions are well-known in the art and are described in U.S. Pat. Nos. 2,913,342 to Cameron et al. and 3,295,986 to Saslaw et al. Cameron et al. produces a preferred powdered fat by spray-drying an emulsion containing a partial ester of a glycol and a higher fatty acid, lecithin, a selectively hydrogenated fat, a cow's milk protein or protein derivative, such as non-fat milk solids, sodium caseinate or whey solids, and a sugar. The powdered fat of Cameron et al. is designed for use as a topping or shortening and is whippable in combination with milk or water. The Saslaw et al. patent is also directed towards the manufacture of a powdered fat for use in preparing whipped toppings. This prior art powdered fats have not been found to be useful in formulating a three-layered, multi-textured, gelatin dessert.

SUMMARY OF THE INVENTION

The product of this invention is a dry-blended, powdered gelatin dessert mix which contains a dry fat emulsion component. The novel dessert mix of this invention, after whipping with water, produces a three-layered dessert consisting of a clear bottom gelled gelatin layer, a middle chiffon layer and a top, aerated foam layer. The dessert mix of this invention will remain free-flowing even at elevated storage temperatures.

The dessert mix composition of this invention enables production of the aformentioned three-layered dessert wherein the line of demarcation between layers is surprisingly well-defined and much improved, as compared to three-layered desserts prepared using the dry mix described in Example I of the aforementioned Wyss et al. patent, which is hereby incorporated by reference. The practice of the present invention enables the use of a relatively low level of a low melting point fat (i.e., Wiley melting point of from 99° to 114° F.) which has been found to improve the texture of the top two layers of the prepared dessert as compared to Example III of the Wyss et al. patent.

The dessert mix composition of this invention is a dry-blended mixture comprised of sweeteners, including sugars, and/or intensive sweeteners such as aspartame, saccharin and the like, gelatin, food acid, buffering agent, flavors, colors and a dry fat emulsion component. In the event a sugar-free dessert mix is desired, the bulk and weight normally provided by a sugar (e.g., sucrose) component could be replaced in whole or in part by any of the well-known bulking agents (e.g., polydextrose, low-density dextrin, etc.).

The dry fat emulsion component is specifically designed for use in dessert mix composition of this invention. The fat component is prepared by drying an aqueous fat emulsion such as by spray-drying. Other known drying techniques which do not involve the use of high product temperatures (e.g., flash drying, spray chilling, etc.) may also be employed. A prime requisite for the dry fat emulsion component is that it not be a whipping component, that is it will not produce a uniform foam upon being whipped with water. The dried fat component is comprised of at least 50% by weight of maltodextrin having a DE of less than 15, from 15 to 30% by weight of a fat having a Wiley melting point of from 99° to 114° F. (37.2° to 45.6° C.), from 1 to 4% by weight of monoglyceride emulsifier and 2 to 8% by weight of gelatin. This powdered fat component is essentially free of milk protein.

It has been found that that gelatin is necessary in the dry fat emulsion component so that sufficient gelatin is present in the top layer of the prepared dessert to help set the foam. It is believed that the gelatin in the dried fat emulsion component stays with the fat and is transported to the top layer; whereas, the powdered gelatin contained in dry blend is not sufficiently effective to set the foam layer. It would be possible to utilize other gelling hydrocolloids (e.g., Gum Arabic) in the fat component for purposes of setting the foam layer; however, gelatin has been found to be unique since the bottom layer of the prepared dessert will be clear. The use of other gelling agents adversely affect the clarity of the bottom layer.

Lecithin may also be included as an ingredient of the dry fat component at a level of about 0.1 to 3% by weight. Lecithin has been found to improve the texture and body of the top foam layer. The term lecithin, as used herein and in the appended claims, is intended to mean phosphatide compositions derived from materials, such as soybeans, corn, cottonseed, peanuts, egg yolks, liver, and the like, containing lecithin in varying degrees of purity. Also, phosphatides modified by various processes, such as hydroxylation, phosphorylation, and the like, may be employed.

DETAILED DESCRIPTION OF THE INVENTION

In the present invention a novel dry fat emulsion composition is prepared which is particularly adapted for use in a gelatin-containing dessert mix which mix can produce a three-layered dessert upon mixing with water. The powdered fat contains a plurality of ingredients which act in cooperation to produce a non-whippable, dry or powdered fat which will function as desired in a multi-layered, gelatin-containing dessert mix.

A preferred technique for producing the dry fat emulsion composition is by spray-drying an aqueous fat emulsion, typically an emulsion having a solids content of from about 40 to 60% by weight. Obviously, other drying techniques could be employed. Typically, the fat ingredient would be melted in a fat mixing tank and the melted fat added to another heated mixing tank along with water and water-soluble ingredients, such as maltodextrin and gelatin, to form an aqueous slurry. A chemical emulsifier could be added to either the fat tank or the slurry tank. If lecithin is used as an ingredient, it is preferably added to the heated fat tank. The aqueous slurry is next homogenized and passed to a spray tower for drying. The spray-dried particles are tempered, or otherwise processed, to obtain a stable powdered fat.

The particular edible fat to be incorporated in the powdered fat composition is one which has a Wiley melting point between 99° and 114° F. and preferably about 110° F. (43.3° C.). Typically hydrogenated forms of unsaturated vegetable oils, such as cottonseed oil, peanut oil, soybean oil and the like, or hydrogenated or non-hydrogenated form of highly-saturated vegetable oils such as coconut oil, palm oil and palm kernel oil will be utilized.

The chemical emulsifier must contain sufficiently high levels of glycerol monoester (i.e. monoglycerides) of high melting point fatty acids, such as stearic and palmitic. The presence of these monoglycerides is essential to obtain the well-defined, three-layered gelatin dessert sought by this invention and these monoglycerides must be present at a level of 5 to 20% by weight of fat. A mixture of mono- and diglycerides will typically be utilized, as these mixtures are readily-available commercial products; however, for purpose of this invention the monoglyceride is believed to be the functional component. Monoglycerides should also be present at a level of from 1 to 4% by weight of the dry fat composition.

The dry fat composition will have water-soluble, hydrolyzed starch solids as its major component, the level usually being about 60 to 70% by weight of the dry fat. Preferably, the hydrolyzed starch will be a maltodextrin and the dextrose equivalent of the maltodextrin will be less than 15, preferably 10 or less. Dextrins having a DE above 20, or other carbohydrate or proteinaceous solids are not as suitable for use in this invention as encapsulating solids as they would result in the bottom gelatin layer of the prepared dessert having a cloudy appearance.

The gelatin component of the dry fat composition may be that which is known commercially as either Type A or Type B gelatin, having been recovered from various collagen-bearing materials by means of an acid or a lime process. Other processes might also be used to recover the gelatin, since the particular type of gelatin utilized is not of paramount importance. It is important, however, that the gelatin be used in an amount effective to set an aerated dispersion of the powdered fat composition. Such gelling ability will depend to an extent upon the bloom of the gelatin. In order that excessively large amounts of gelatin need not be used, it is preferable that the gelatin have a bloom of at least 150, although, obviously, greater quantities of gelatin could be utilized for lower bloom gelatins.

To produce the multi-layered dessert mix of this invention, the dry fat composition is dry-blended with other desired or necessary ingredients. For conventional, full-calorie versions of the dessert mix sucrose will be added and will constitute from about 60 to 80% by weight of the mix. Other sugars such as dextrose, maltose or fructose or sugar alcohols such as mannitol, sorbitol or xylitol could of course be utilized to replace all or a portion of the sucrose. For low-calorie embodiments of the dessert mix, all or a portion of the caloric sweeteners could be replaced by one or more food-approved, intensive sweeteners. The use of bulking agents having a low-caloric density may be useful in combination with the use of intensive sweeteners.

The multi-layered dessert mix will contain at least 4% by weight dry-blended gelatin which may be any of the previously-referred to gelatins available to those in the art. Preferably, the gelatin will have a bloom in excess of 200 and typically the bloom will be from about 250 to about 275. For sugar-sweetened dessert mixes the dry-blended gelatin level will be less than 8%. If sugar were to be entirely replaced by an intensive sweetener, such as aspartame, the level of dry-blended gelatin could be as much as 25% by weight of the dessert mix.

The multi-layered dessert mix will contain from about 12 to 30% by weight of the dry fat emulsion component in those instances where sugar is used as the sweetener and up to about 70% by weight when sugar sweeteners are not employed. The dry fat is preferably employed in the mix at a level such that the weight of fat contained in the mix is less than the total weight of gelatin contained in the mix. This relatively low level of fat has been found to give an improved taste and texture to the prepared dessert as compared to a higher fat level as called for in the aforemention Wyss patent. According to this invention, gelatin is present in the dessert mix at a weight level which is from 110 to 140% the level of fat as compared to a gelatin level of 45 to 100% in the Wyss et al. patent and 56% in the Henderson et al. patent.

Other ingredients which would be present in the dessert mix are food acid, flavor and color. Buffering agents, flow agents, flavor enhancers, vitamins, minerals and other conventional functional ingredients could also be included in the dessert mix. Preferably, all such ingredients are incorporated into the dessert mix by dry-blending.

Preferred food acids include citric, fumaric and adipic with a combination of adipic and fumaric acid being most preferred. The level of food acid will typically be from 1 to 4% by weight of a sugar-sweetened dry mix and up to 9.2% by weight of a sugar-free mix. A buffering agent, such as trisodium citrate, is usually included in the mix at a level of about 0.3 to 3% by weight in order to maintain the acidity of the prepared dessert within a range which provides both good taste and good gel formation and texture.

Fruit flavors and their corresponding colors agent are most commonly utilized for the gelatin-containing dessert mixes of this invention; however, other flavors and colors may also be used. If a multi-colored and multi-layered prepared dessert is desired, then the use of a fat-soluble coloring agent in combination with a water-soluble coloring agent can be employed in accordance with the teachings of commonly-assigned, U.S. Pat. No. 3,734,745 to Cassanelli, et al. This patent which is hereby incorporated by reference suggest the use of carotenoids as fat-soluble coloring agents and FD&C dyes as water-soluble coloring agents.

The dessert mix of the present invention and the use thereof is further exemplified by the following Examples:

EXAMPLE 1

A powdered fat is obtained by spray-drying an homogenized emulsion, said emulsion containing about 45% solids, said solids consisting of:

|  | (Weight %) |
| --- | --- |
| Maltodextrin (10 DE) | 60–70 |
| Hydrogenated Palm Kernel Oil w/Preservative | 20–28 |
| Di- and Monoglycerides (52% Monoester) | 4–6 |
| Gelatin (150 Bloom) | 4–6 |
| Soy Lecithin | 02–08 |

The fat and lecithin are mixed in a heated and agitated tank at about 160° F. This mixture is then passed to a heated (about 160° F.) and agitated slurry tank together with water, maltodextrin, gelatin and emulsifier. The heated slurry is then homogenized and passed to a spray tower where the emulsion is atomized into a stream of heated air. The spray-dried particles are passed through a cyclone separator, tempered and collected.

EXAMPLE 2

A powdered dessert mix is prepared by dry-blending the following ingredients:

|  | (Weight %) |
| --- | --- |
| Sucrose | 65–75 |
| Spray-Dried Fat of Example 1 | 15–25 |
| Gelatin (250 Bloom) | 4–8 |
| Adipic Acid | 1.5–3 |
| Trisodium Citrate | 0.3–0.8 |
| Fumaric Acid | 0.1–0.4 |
| Flavor and Color | (as desired) |

EXAMPLE 3

A three-layered dessert is prepared utilizing the mix of Example 2 by adding 125.3 grams of the mix to a blender together with one cup (237 ml) of boiling water. The blender is then operated at its lowest speed for about 30 seconds until the mix is dissolved and then the blender is operated at its highest speed for one minute. Thereafter, one cup of ice cold water is added to the blender and mixing at the highest blender speed is continued for an additional minute. The mixture is immediately poured into four dessert glasses until each is about half full, then the glasses are filled completely in the same order. The glasses are placed in a refrigerator for about three hours to set the gelatin and to develop the dessert into a colorful, three-layered dessert having a lower layer which substantially resembles gelatin dessert in texture and appearance and having a high ratio of gelatin to fat, a middle layer having a custard-like texture and appearance and a ratio of gelatin to fat less than that of the upper layer, and an upper layer having an aerated creamy fat or whipped foamy topping like appearance.

EXAMPLE 4

A sugar-free powdered dessert mix is prepared by dry-blending the following ingredients:

|  | (Weight %) |
| --- | --- |
| Spray Dried Fat of Example 1 | 60–75 |
| Gelatin (250 Bloom) | 15–25 |
| Adipic Acid | 4–8 |
| Trisodium Citrate | 1–3 |
| Aspartame | 0.7–1.0 |
| Fumaric Acid | 0.4–1.2 |
| Flavor and Color | (as desired) |

Following the recipe of Example 3, 36.2 grams of this dry-blended mix was utilized to prepare a three-layered dessert. After the three-hour set, the dessert was comparable in appearance, texture and taste to the dessert of Example 3.

Having thus described the invention what is claimed is:

1. A three-layered, gelatin-containing dessert mix comprising a dry blend of:
   (a) sugars and/or low-calorie bulking agents and/or intensive sweeteners;
   (b) gelatin;
   (c) food acid;
   (d) buffering agent;
   (e) flavors and colors; and
   (f) a maltodextrim encapsulated dry fat emulsion component, said component comprised of at least 50% by weight water-soluble, maltodextrin having a D.E. less than 15, 15 to 30% by weight fat having a Wiley melting point between about 99° and 114° F., 1 to 4% by weight of monoglyceride emulsifier, 2 to 8% by weight gelatin, said dry fat emulsion component being esstentially free of dairy proteins and said powdered fat component not being a whipping component, and wherein the weight of gelatin contained in the mix exceeds the weight of fat contained in the mix.

2. The desert mix of claim 1 wherein the dry fat is a spray-dried powder.

3. The dessert mix of claim 2 wherein the spray-dried fat contains from 0.1 to 3% by weight lecithin.

4. The dessert mix of claim 2 wherein the dry fat contains emulsifiers which consist essentially of mono- and diglycerides.

5. The dessert mix of claim 2 wherein the weight of gelatin is from 110 to 140% of the weight of fat.

6. A three-layered, sugar-containing and gelatin-containing dessert mix comprising a dry blend of:
   (a) 50 to 80% by weight sugars;
   (b) 4 to 8% by weight gelatin;
   (c) 1 to 4% by weight food acid;
   (d) buffering agent;
   (e) flavors and colors; and
   (f) 12 to 30% by weight maltodextrin encapsulated dry fat emulsion component,
said component comprised of at least 50% by weight water-soluble maltodextrin having a D.E. less that 15, 15 to 30% by weight fat having a Wiley melting point between about 99° and 114° F., 1 to 4% by weight of monoglyceride emulsifier, 2 to 8% by weight gelatin, said dry fat emulsion component being essentially free of dairy proteins and said powdered fat component not being a whipping component, and wherein the weight of gelatin contained in the mix exceeds the weight of fat contained in the mix.

7. The dessert mix of claim 6 wherein the dry fat is a spray-dried powder.

8. The dessert mix of claim 7 wherein the spray-dried fat contains from 0.1 to 3% by weight lecithin.

9. The dessert mix of claim 7 wherein the powdered fat contains emulsifiers which consist essentially of mono- and diglycerides.

10. The dessert mix of claim 7 wherein the weight of gelatin is from 100 to 140% of the weight of fat.

11. A three-layered, sugar-free, gelatin-containing dessert mix comprising a dry blend of:
    (a) 15 to 25% by weight gelatin
    (b) 4.4 to 9.2% by weight food acid
    (c) buffering agent
    (d) flavors and colors
    (e) 60 to 70% by weight maltodextrin encapsulated dry fat emulsion component, said component comprised at least 50% by weight water-soluble maltodextrin having a D.E. less than 15, 15 to 30% by weight fat having a Wiley melting point between about 99° and 114° F., 1 to 4% by weight monoglyceride emulsifier, 2 to 8% by weight gelatin, said dry fat emulsion component being essentially free of dairy protein and said powdered fat component not being a whipping component, and wherein the weight of gelatin contained in the mix exceeds the weight of fat contained in the mix.

12. The dessert mix of claim 11 wherein the dry fat is a spray-dried powder.

13. The dessert mix of claim 12 wherien the spray-dried fat contains from 0.1 to 3% by weight lecithin.

14. The dessert mix of claim 12 wherein the powdered fat contains emulsifiers which consist essentially of mono- and diglycerides.

15. The dessert mix of claim 12 wherein the weight of gelatin is from 110 to 140% of the weight of fat.

* * * * *